United States Patent [19]

Saito et al.

[11] Patent Number: 5,416,169
[45] Date of Patent: May 16, 1995

[54] POLYPROPYLENE HAVING A HIGH MELT-TENSILE STRENGTH, A PROCESS FOR PRODUCING THE SAME AND A MOLDED PRODUCT FROM THE SAME

[75] Inventors: Jun Saito, Sodegaurashi; Shunji Kawazoe; Shingo Kikukawa, both of Ichiharashi, all of Japan

[73] Assignee: Chisso Corporation, Osaka, Japan

[21] Appl. No.: 147,582

[22] Filed: Nov. 5, 1993

[30] Foreign Application Priority Data

Nov. 26, 1992 [JP] Japan .................................. 4-339673
Mar. 15, 1993 [JP] Japan .................................. 5-080064
Apr. 14, 1993 [JP] Japan .................................. 5-110996

[51] Int. Cl.$^6$ .............................................. C08F 8/00
[52] U.S. Cl. .................. 525/387; 525/333.8; 525/385; 525/386
[58] Field of Search ..................... 525/385, 386, 387

[56] References Cited

U.S. PATENT DOCUMENTS

| | | | |
|---|---|---|---|
| 4,387,044 | 6/1983 | Sanchez et al. | 525/386 |
| 4,818,785 | 4/1989 | Otawa et al. | 525/387 |
| 4,842,765 | 6/1989 | Satomi | 525/387 |
| 4,900,781 | 2/1990 | Hirai et al. | 525/387 |
| 5,047,485 | 9/1991 | De Nicola, Jr. | 525/387 |

*Primary Examiner*—Bernard Lipman
*Attorney, Agent, or Firm*—Lowe, Price, LeBlanc & Becker

[57] ABSTRACT

A linear, crystalline polypropylene having a branching coefficient of substantially 1, and a specified relation between melt-tensile strength and intrinsic viscosity, a specified relation between crystallization temperature and melting point, a boiling xylene-extraction residue % of 1 wt. % or less and if necessary, a specified ratio of weight average M.W./number average M.W.; a molded product from the above polypropylene; and a process for producing a polypropylene having the above polypropylene blended with di-2-ethylhexyl peroxydicarbonate, are provided, the above polypropylenes having a very high melt-tensile strength and crystallization temperature and also superior stiffness and moldability, to thereby broaden the restricted application fields of conventional polypropylene.

9 Claims, No Drawings

POLYPROPYLENE HAVING A HIGH MELT-TENSILE STRENGTH, A PROCESS FOR PRODUCING THE SAME AND A MOLDED PRODUCT FROM THE SAME

BACKGROUND OF THE INVENTION

1. Field of the Invention

This invention relates to a propylene having a high melt-tensile strength. More particularly, it relates to a polypropylene having a high melt-tensile strength and crystallization temperature, having a superior stiffness and moldability, and capable of being remelted and used in a recycle manner after used as a molded product, a process for producing the polypropylene and a molded product therefrom.

2. Description of the Related Art

Crystalline polypropylene is superior in the mechanical properties, chemical resistance, etc. and very useful in the aspect of the balance between these properties and economy; hence it has been broadly used in various molding fields. However, since it has a low melt-tensile strength and a low crystallization temperature, it is inferior in moldability at the time of blow molding, foam molding, extrusion molding, etc.

As a method for elevating the melt-tensile strength and the crystallization temperature of crystalline polypropylene, a method of reacting an organic peroxide and a crosslinking agent with crystalline polypropylene in molten state is disclosed (Japanese patent application laid-open Nos. Sho 59-93711 and Sho 61-152754), but since a crosslinking agent is used, there has been raised a problem that odor remains in the resulting modified polypropylene. Further, improvement in the melt-tensile strength is insufficient; thus if the quantities of the organic peroxide and the crosslinking agent added are increased in order to elevate the melt-tensile strength, gel is formed; hence the moldability has been deteriorated and further, it has been impossible to remelt the polypropylene and use it in a recycle manner.

On the other hand, Japanese patent application laid-open No. Hei 2-298536 discloses that a method of reacting a peroxide of a low decomposition temperature with a semicrystalline polypropylene in the absence of oxygen, to thereby obtain a polypropylene having a free end, long chain branch and containing no gel. However, the improvement in the melt-tensile strength of the resulting polypropylene has been insufficient.

(Problems to be Solved by the Invention)

As described above, the polypropylenes obtained according to the methods of known inventions have raised such problems that it is insufficient in the improvements of the melt-tensile strength and the crystallization temperature, and besides since it has odor or contains gels; hence it is impossible to remelt and use it in a recycle manner.

The present inventors have made extensive research in a polypropylene having solved the problems of the above known inventions and suitable to blow molding, foam molding, extrusion molding, etc., and a process for producing the same, and as a result, have found that when a specified organic peroxide is reacted with a polypropylene under specified conditions, followed by melt-kneading, then a polypropylene having a high melt-tensile strength is obtained and when this polypropylene is used as a molded product, the problems of the prior inventions can be solved, and the first and second inventions of the present application have been completed.

The present inventors have made further research, and as a result, have found that when a polypropylene composition containing a polypropylene having a high viscosity in a specified quantity is used, the melt-tensile strength is further notably improved. Based upon this knowledge, the third invention has been completed.

As apparent from the foregoing, the object of the present inventions is to provide a polypropylene having a high melt-tensile strength and crystallization temperature and also having a superior stiffness and moldability, and yet being capable of remelting the polypropylene after used as a molded product and using it in a recycle manner; a process for producing the polypropylene; and a molded product from the polypropylene.

SUMMARY OF THE INVENTION

The present inventions are composed of the first invention having constitutions of the following items (1) to (10), the second invention having those of the following items (11) to (20), and the third invention having those of the following items (21) and (22):

(1) A polypropylene having a high melt-tensile strength, characterized by
a linear, crystalline polypropylene having a branching coefficient of substantially 1, and satisfying
(A) a relationship between a melt-tensile strength (MS) at 230° C. and an intrinsic viscosity $[\eta]$ measured in tetralin at 135° C., expressed by the expression $$\log (MS) > 4.24 \times \log [\eta] - 0.843,$$

and
(B) a relationship between a recrystallization temperature (Tc) measured by means of a differential scanning calorimeter (DSC) and a melting point (Tm), expressed by the expression $$(Tc) > 0.784 \times (Tm) - 4.00,$$

and having
(C) a percentage of boiling xylene-extraction residue of 1% by weight or less.

(2) A polypropylene having a high melt-tensile strength, according to item (1), wherein said crystalline polypropylene is a propylene homopolymer.

(3) A polypropylene having a high melt-tensile strength, according to item (1), wherein said crystalline polypropylene is a propylene-olefin random copolymer containing 10% by weight or less of polymerization units of an olefin other than propylene.

(4) A process for producing a polypropylene having a high melt-tensile strength, which process comprises mixing 1 to 10 millimols of di-2-ethylhexyl peroxydicarbonate with 100 g of a linear, crystalline polypropylene in an inert gas atmosphere, followed by reacting the mixture at 70° to 150° C. for 10 minutes to 3 hours and then melt-kneading the reaction material, the resulting polypropylene being
a linear, crystalline polypropylene having a branching coefficient of substantially 1, and satisfying
(A) a relationship between a melt-tensile strength (MS) at 230° C. and an intrinsic viscosity $[\eta]$ measured in tetralin at 135° C., expressed by the expression $$\log (MS) > 4.24 \times \log [\eta] - 0.843,$$

and (B) a relationship between a recrystallization temperature (Tc) measured by means of a differential scanning calorimeter (DSC) and a melting point (Tm), expressed by the expression $$(Tc) > 0.784 \times (Tm) - 4.00,$$

and having (C) a percentage of boiling xylene-extraction residue of 1% by weight or less.

(5) A process according to item (4), wherein said crystalline polypropylene is propylene homopolymer.

(6) A process according to item (4), wherein said crystalline polypropylene is a propylene-olefin random copolymer containing 10% by weight or less of polymerization units of an olefin other than propylene.

(7) A process according to item (4), wherein, after the reaction of the crystalline polypropylene with di-2-ethylhexyl peroxydicarbonate, the resulting material is successively subjected to post-treatment of heating it at 100° to 150° C. for 10 minutes to 3 hours in an inert gas atmosphere.

(8) A molded product obtained using a polypropylene having a high melt-tensile strength, which is
a linear, crystalline polypropylene having a branching coefficient of substantially 1, and satisfying
(A) a relationship between a melt-tensile strength (MS) at 230° C. and an intrinsic viscosity [η] measured in tetralin at 135° C., expressed by the expression $$\log (MS) > 4.24 \times \log [\eta] - 0.843,$$

and (B) a relationship between a recrystallization temperature (Tc) measured by means of a differential scanning calorimeter (DSC) and a melting point (Tm), expressed by the expression $$(Tc) > 0.784 \times (Tm) - 4.00,$$

and having (C) a percentage of boiling xylene-extraction residue of 1% by weight or less.

(9) A molded product according to item (8), wherein said crystalline polypropylene is propylene homopolymer.

(10) A molded product according to item (8), wherein said crystalline polypropylene is a propylene-olefin random copolymer containing 10% by weight or less of polymerization units of an olefin other than propylene.

(11) A polypropylene having a high melt-tensile strength, which is
a linear, crystalline polypropylene having a branching coefficient of substantially 1, and satisfying
(A) a relationship between a melt-tensile strength (MS) at 230° C. and an intrinsic viscosity [η] measured in tetralin at 135° C., expressed by the expression $$\log (MS) > 4.24 \times \log [\eta] - 0.685,$$

and (B) a relationship between a recrystallization temperature (Tc) measured by means of a differential scanning calorimeter (DSC) and a melting point (Tm), expressed by the expression $$(Tc) > 0.784 \times (Tm) - 4.00,$$

and having (C) a percentage of boiling xylene-extraction residue of 1% by weight or less, and also (D) a value (Q) of weight average molecular weight (Mw)/number average molecular weight (Mn) of 7 to 30.

(12) A polypropylene according to item (11), wherein said crystalline polypropylene is a propylene homopolymer.

(13) A polypropylene according to item (11), wherein said crystalline polypropylene is a propylene-olefin random copolymer containing 10% by weight or less of an olefin other than propylene.

(14) A process for producing a polypropylene having a high melt-tensile strength, which process comprises mixing 1 to 10 mmols of di-2-ethylhexyl peroxydicarbonate with 100 g of a linear, crystalline polypropylene having a value (Q) of weight average molecular weight (Mw)/number average molecular weight (Mn) of 7 to 30, in an inert gas atmosphere, reacting the mixture at 70° to 150° C. for 10 minutes to 3 hours and melt-kneading the resulting product, the resulting polypropylene being
a linear, crystalline polypropylene having a branching coefficient of substantially 1, and satisfying
(A) a relationship between a melt-tensile strength (MS) at 230° C. and an intrinsic viscosity [η] measured in tetralin at 135° C., expressed by the expression $$\log (MS) > 4.24 \times \log [\eta] - 0.685,$$

and (B) a relationship between a recrystallization temperature (Tc) measured by means of a differential scanning calorimeter (DSC) and a melting point (Tm), expressed by the expression $$(Tc) > 0.784 \times (Tm) - 4.00,$$

and having (C) a percentage of boiling xylene-extraction residue of 1% by weight or less, and also (D) a value (Q) of weight average molecular weight (Mw)/number average molecular weight (Mn) of 7 to 30.

(15) A process according to item (14), wherein said crystalline polypropylene is a propylene homopolymer.

(16) A process according to item (14), wherein said polypropylene is a propylene-olefin random copolymer containing 10% by weight or less of polymerization units of an olefin other than propylene.

(17) A process according to item (14), wherein, after the reaction of the crystalline polypropylene with di-2-ethylhexyl peroxydicarbonate, the resulting material is successively subjected to post-treatment of heating it at 100° to 150° C. for 10 minutes to 3 hours in an inert gas atmosphere.

(18) A molded product obtained by using a polypropylene having a high melt-tensile strength, which is
a linear, crystalline polypropylene having a branching coefficient of substantially 1, and satisfying (A) a relationship between a melt-tensile strength (MS) at 230° C. and an intrinsic viscosity $[\eta]$ measured in tetralin at 135° C., expressed by the expression log (MS)>4.24×log $[\eta]$−0.685, and (B) a relationship between a recrystallization temperature (Tc) measured by means of a differential scanning calorimeter (DSC) and a melting point (Tm), expressed by the expression (Tc)>0.784×(Tm)−4.00, and having (C) a percentage of boiling xylene-extraction residue of 1% by weight or less, and also (D) a value (Q) of weight average molecular weight (Mw)/number average molecular weight (Mn) of 7 to 30.

(19) A molded product according to item (18), wherein said crystalline polypropylene is a propylene homopolymer.

(20) A molded product according to item (18), wherein said crystalline polypropylene is a propylene-olefin random copolymer containing 10% by weight or less of polymerization units of an olefin other than propylene.

(21) In the process of reacting di-2-ethylhexyl peroxydicarbonate with a linear, crystalline polypropylene (PP1) in an inert gas atmosphere, followed by melt-kneading, to thereby produce a polypropylene (PP2) which is a linear, crystalline polypropylene having a branching coefficient of substantially 1, and satisfying (A) a relationship between a melt-tensile strength (MS) at 230° C. and an intrinsic viscosity $[\eta]$ measured in tetralin at 135° C., expressed by the expression log (MS)>4.24×log $[\eta]$−0.685, and (B) a relationship between a recrystallization temperature (Tc) measured by means of a differential scanning calorimeter (DSC) and a melting point (Tm), expressed by the expression (Tc)>0.784×(Tm)−4.00, and having (C) a percentage of boiling xylene-extraction residue of 1% by weight or less, a process for producing a polypropylene, which comprises using a crystalline polypropylene composition (PP4) containing a crystalline polypropylene (PP3) having an intrinsic viscosity $[\eta]$ of 2.5 to 10 dl/g as measured in tetralin at 135° C., in a quantity of 1 to 50% by weight, as said linear, crystalline polypropylene (PP1), the intrinsic viscosity $[\eta]$ as a whole being 1.0 to 4.0 dl/g.

(22) A molded product obtained using a linear, crystalline polypropylene obtained by reacting di-2-ethylhexyl peroxydicarbonate with a crystalline polypropylene composition (PP4) containing a crystalline polypropylene (PP3) having an intrinsic viscosity of 2.5 to 10 dl/g as measured in tetralin at 135° C. in a quantity of 1 to 50% by weight, in an inert gas atmosphere, the intrinsic viscosity $[\eta]$ as a whole being 1.0 to 4.0 dl/g, followed by melt-kneading, and having a branching coefficient of substantially 1, and satisfying (A) a relationship between a melt-tensile strength (MS) at 230° C. and an intrinsic viscosity $[\eta]$ measured in tetralin at 135° C., expressed by the expression log (MS)>4.24×log $[\eta]$−0.685, and (B) a relationship between a recrsytallization temperature (Tc) measured by means of a differential scanning calorimeter (DSC) and a melting point (Tm), expressed by the expression (Tc)>0.784×(Tm)−4.00, and having (C) a percentage of boiling xylene-extraction residue of 1% by weight or less.

DETAILED DESCRIPTION OF PREFERRED EMBODIMENTS

The constitutions of the present invention will be described in more detail.

In addition, the polypropylene of the present invention includes not only propylene homopolymer, but also propylene-olefin random copolymers containing 10% by weight or less of polymerization units of an olefin other than propylene. Thus, the description of polypropylene hereinafter referred to will be made in this meaning.

The polypropylene of the present invention refers to a linear, crystalline polypropylene having a branching coefficient of substantially 1. The branching coefficient refers to an extent of a long chain branching, but in general, it is defined by the following equation:

Branching coefficient (g)=$[\eta]_{Br}/[\eta]_{Lin}$

Herein, $[\eta]_{Br}$ means an intrinsic viscosity of branched polypropylene, and it refers to an observed value $[\eta]_{Obs}$ of polypropylene of the present invention in the present specification. Further, $[\eta]_{Lin}$ referred to in the specification means the intrinsic viscosity of a linear, crystalline polypropylene, obtained according to the same process as that obtained according to known process and used as the raw material in the process for producing polypropylene of the present invention mentioned below, and having the same weight average molecular weight as that of the sample having the above-mentioned $[\eta]_{Obs}$.

The above ratio of intrinsic viscosities represents a branching coefficient of non-linear polymer, and when a long chain branch is present, the ratio becomes less than 1.

In addition, the measurement of the intrinsic viscosities was carried out using a sample dissolved in tetralin at 135° C.

Further, the weight average molecular weight (Mw) and the number average molecular weight (Mn) were measured according to the method announced by M. L. McConnell (American Laboratory, May, 63–75 (1978), i.e. according to a low angle laser light-scattering light intensity-measurement method.

The polypropylene of the present invention has a branching coefficient according to the above definition and the above measurement method, of substantially 1 and has no long chain-branched structure.

In addition, the terms "substantially 1" mean that even if there were a long chain branch, its content is less than detection limit value, and also the terms mean "1" including the range of statistical error in the case where the same sample is repeatedly measured according to the above method. Thus, the terms "substantially 1" refer to a value of about 0.95 to 1.05 as a substantial value.

Since the branching coefficient is substantially 1, the polypropylene of the present invention has the same properties as those of known linear polypropylene except for the characteristics specific of the polypropylene of the present invention mentioned below; hence the polypropylene of the present invention has a characteristic that the molding process and device used for known linear polypropylene are usable as they are.

Further, the polypropylene of the present invention has indispensable requirements of three items of (A), (B) and (C) in the first invention, those of four items of (A), (B), (C) and (D) in the second invention, and those of three items of (A'), (B) and (C) in the third invention.

Namely, the polypropylene of the present invention is characterized by satisfying (A) a relationship between a melt-tensile strength (MS) at 230° C. and an intrinsic viscosity [η] measured in tetralin at 135° C., expressed by the expression $$\log (MS) > 4.24 \times \log [\eta] - 0.843,$$

(A') a relationship between a melt-tensile strength (MS) at 230° C. and an intrinsic viscosity [η] measured in tetralin at 135° C., expressed by the expression $$\log (MS) > 4.24 \times \log [\eta] - 0.685,$$

(B) a relationship between a recrystallization temperature (Tc) measured by means of a differential scanning calorimeter (DSC) and a melting point (Tm), expressed by the expression $$(Tc) > 0.784 \times (Tm) - 4.00,$$

(C) a percentage of boiling xylene-extraction residue of 1% by weight or less, and (D) a value (Q) of weight average molecular weight (Mw)/number average molecular weight (Mn) of 7 to 30.

The melt-tensile strength of the polypropylene necessary for achieving the object of the first invention of the present invention consists in a relationship between a melt-tensile strength (MS) at 230° C. and an intrinsic viscosity [η] measured in tetralin at 135° C., expressed by the expression $$\log (MS) > 4.24 \times \log [\eta] - 0.843,$$

as described above, preferably a relationship expressed by the formula, $\log (MS) > 4.24 \times \log[\eta] - 0.570$.

The melt-tensile strength of the polypropylene necessary for achieving the objects of the second invention and the third invention consists in a relationship between a melt-tensile strength (MS) at 230° C. and an intrinsic viscosity [η] measured in tetralin at 135° C., expressed by the expression $$\log (MS) > 4.24 \times \log [\eta] - 0.685,$$

as described above, preferably a relationship expressed by the formula, $$\log (MS) > 4.24 \times \log [\eta] - 0.470.$$

The melt-tensile strength (MS) at 230° C. herein refers to a value obtained by heating a polypropylene at 230° C. in a device, a melt-tension tester, type 2, manufactured by Toyoseiki Seisakusho Co., Ltd., followed by extruding the resulting molten polypropylene from a nozzle of 2.095 mm in diameter at a rate of 20 mm/min. into the atmosphere, taking up the resulting strand at a rate of 3.14 m/min. and measuring the tension of the resulting fibrous polypropylene at that time.

Further, the crystallization temperature of the polypropylene necessary for achieving the object of the present invention is necessary to satisfy a relationship between a recrystallization temperature (Tc) measured by means of a differential scanning calorimeter (DSC) and a melting point (Tm), expressed by the expression $$(Tc) > 0.784 \times (Tm) - 4.00,$$

preferably $$(Tc) > 0.784 \times (Tm) - 3.00.$$

If the above relationship is not satisfied, the crystallization is slow so that the characteristic of the superior moldability of the polypropylene is lost.

As to the crystallization temperature (Tc) and the melting point (Tm), the latter melting point (Tm) was determined by raising the temperature of a polypropylene from room temperature up to 230° C. under a temperature-raising condition of 30° C./min. by means of DSC7 type differential scanning calorimeter manufactured by Perkin-Elmer Co., Ltd., followed by keeping the same temperature for 10 minutes, lowering the temperature down to −20° C. at a rate of −20° C./min., keeping the same temperature for 10 minutes, and melting the polypropylene under a temperature-raising condition of 20° C./min., to render the temperature showing the maximum peak at the time of the melting, as the melting point (Tm). Further, the former crystallization temperature (Tc) was determined by raising the temperature of the polypropylene successively to the appearance of the melting point, up to 230° C. under the same condition, followed by keeping the same temperature for 10 min., lowering the temperature down to 150° C. at a rate of −80° C./min. and lowering the temperature from 150° C. at a rate of −5° C./min., to render the temperature showing the maximum peak at the time of the crystallization during the temperature-lowering as the crystallization temperature (Tc).

Further, as described above, it is necessary for the polypropylene of the present invention that the percentage of boiling xylene-extraction residue be 1% by weight or less, preferably 0.6% by weight or less. If the percentage of the extraction residue is more than the above value, the moldability not only becomes inferior, but also it is very difficult to remelt the polypropylene after used as molded product and again use it in recycle manner.

The percentage of boiling xylene-extraction residue was determined by placing a polypropylene (1 g) in a metal gauze of 200 mesh, provided in Soxhlet extractor, followed by extracting the polypropylene with boiling xylene (p-xylene (200 ml)) for 6 hours, drying and weighing the extraction residue, and calculating the aimed percentage of boiling xylene-extraction residue in terms of (weight of extraction residue/weight before extraction)×100%.

Further, it is necessary for the polypropylene of the second invention that the value(Q) of the weight average molecular weight (Mw)/number average molecular weight (Mn), as a measure of the molecular weight distribution of polypropylene, be 7 to 30. If the molecular weight distribution (Q) is less than 7, improvement in the melt-tensile strength is insufficient, while if it exceeds 30, the moldability becomes inferior and gel is liable to occur.

The weight average molecular weight (Mw) and the number average molecular weight (Mn) were determined according to the method described above, to calculate the Q value.

The polypropylene of the present invention is, besides the above-described characteristics, provided with the accompanying characteristics that the crystallinity as measured according to X-ray diffractometry is 10% or more, the intrinsic viscosity [$\eta$] as measured in tetralin at 135° C. is 0.5 to 5 dl/g, preferably 0.7 to 4 dl/g, the average molecular weight (Mw) is 80,000 to 1,100,000, particularly preferably 120,000 to 850,000, and the value of the weight average molecular weight/number average molecular weight, as a measure of molecular weight distribution, is 3 to 7, particularly preferably 3.5 to 7.

Further, the polypropylene of the second invention of the present invention is, besides the above-described characteristics, provided with the accompanying characteristics that the crystallinity as measured according to X-ray diffractometry is 10% or more, the intrinsic viscosity [$\eta$] as measured in tetralin at 135° C. is 0.5 to 5 dl/g, particularly preferably 0.7 to 4 dl/g, and the weight average molecular weight (Mw) is 80,000 to 1,100,000, particularly preferably 120,000 to 900,000.

In addition, the crystalline polypropylene used for producing the polypropylene of the second invention of the present invention is required in view of the effect of improving the melt-tensile strength, to have a broad molecular weight distribution wherein the value (Q) of the weight average molecular weight (Mw)/the number average molecular weight (Mn) as a measure of the molecular weight distribution is 7 to 30.

Next, a process for producing the polypropylene of the first invention of the present invention will be described.

The crystalline polypropylene used for producing the polypropylene of the present invention is a crystalline polypropylene having a crystallinity of 10% or more, as measured according to X-ray diffractometry, and is preferred to have an intrinsic viscosity [$\eta$] of 0.5 to 5 dl/g, particularly preferably 0.7 to 4 dl/g, as measured in tetralin at 135° C., in the aspect of moldability.

Further, not only propylene homopolymer, but also random copolymers of propylene with an olefin other than propylene, such as linear monoolefins e.g. ethylene, butene-1, pentene-1, hexene-1, heptene-1, octene-1, etc., branched monoolefins e.g. 4-methylpentene-1, 2-methylpentene-1, etc., further, styrene, etc., are also usable. When copolymers are used, the olefin other than propylene is not limited to one kind, but it does not matter if two kinds or more are contained.

Concretely, propylene-ethylene copolymer, propylene-butene-1 copolymer, propylene-hexene-1 copolymer, propylene-octene-1 copolymer, propylene-4-methylpentene-1 copolymer, propylene-ethylene-butene-1 copolymer, propylene-ethylene-4-methylpentene-1 copolymer, etc. are illustrated. At that time, the content of the polymerization units of olefin(s) other than propylene is required to be 10% by weight or less. If it exceeds 10% by weight, gel occurs in the resulting polypropylene; thus the content is outside the range of the present invention.

Next, a detailed process for producing polypropylene (PP2) obtained according to the above described third invention of the present invention will be described below.

For the crystalline polypropylene (PP1) used for the process for producing the polypropylene of the present invention, it is necessary in the aspect of the effect upon improvement in the melt-tensile strength, to use a crystalline polypropylene composition (PP4) containing 1 to 50% by weight of a crystalline polypropylene (PP3) having an intrinsic viscosity [$\eta$] of 2.5 to 10 dl/g as measured in tetralin at 135° C., and having an intrinsic viscosity [$\eta$] as a whole of 1.0 to 4.0 dl/g.

If the crystalline polypropylene (PP3) has an intrinsic viscosity lower than 2.5 dl/g, the effect upon improvement in the melt-tensile strength is inferior, while if the viscosity exceeds 10 dl/g, gel occurs in the resulting polypropylene; hence the viscosity is outside the range of the present invention. If the proportion of the crystalline polypropylene having a high viscosity (PP3) in the whole of the crystalline polypropylene composition (PP4) obtained by blending one kind or more of a crystalline polypropylene (PP5) with the crystalline polypropylene having the high viscosity (PP3), is less than 1% by weight, the effect upon improvement in the melt-tensile strength is inferior, while if it exceeds 50% by weight, gel occurs in the resulting polypropylene or the processing moldability becomes inferior.

Further, if the intrinsic viscosity as the whole, of the crystalline polypropylene composition (PP4) is lower than 1.0 dl/g, the impact strength of the resulting polypropylene is low, while if it exceeds 4.0 dl/g, the processing moldability of the resulting polypropylene becomes inferior.

Further, the stereoregularity of the crystalline polypropylene (PP1) used for the process of producing the polypropylene of the present invention has no particular limitation, but in order that the resulting polypropylene (PP2) retains a high stiffness, the polypropylene is preferred to have a stereoregularity to a certain extent or more. Namely, if a propylene homopolymer is used as the crystalline polypropylene (PP1), a crystalline polypropylene having a stereo-regularity (II) expressed in terms of the percentage of extraction residue (% by weight) obtained after extraction with boiling n-heptane for 6 hours, of 80% or more, preferably 90% or more, and particularly preferably 95% or more, is used. Further, if a propylene-olefin random copolymer is used, a crystalline propylene having a stereoregularity (II) of 20% or more, preferably 30% or more is used.

The polypropylene (PP2) obtained according to the production process of the present invention is more improved in the stiffness than the crystalline polypropylene composition (PP4) used as the raw material, but a polypropylene (PP2) having a particularly high stiffness is desired, it is preferred that the stereo-regularity defined above falls within the above range, as the whole of the crystalline polypropylene composition (PP4).

The production process of the polypropylene composition (PP4) containing the crystalline polypropylene having a specified intrinsic viscosity has no particular limitation, but various known processes may be employed.

For example, these known processes for propylene polymerization include slurry polymerization using an inert solvent, bulk polymerization using propylene itself as solvent, and gas phase polymerization carried out in gas phase composed mainly of propylene, using the so-called Ziegler-Natta catalyst, that is, a combination of a titanium catalyst component (a solid composition containing TiCl$_3$ component or a solid composition having TiCl$_4$ supported on a carrier such as Mg compound e.g. MgCl$_2$, silica and a polymer, etc.) with an organoaluminum compound, and in some cases, a composition having further combined a third catalyst component such as an electron donor component containing either atom of O, N, P and S in the molecule e.g. ethers, esters, organosilicon compounds containing Si—O—C bond, etc. Further, there may be other processes such as ① a process of blending a crystalline polypropylene (PP3) having an intrinsic viscosity [η] of 2.5 to 10 dl/g, obtained according to a known process having combined the above-mentioned processes, with one kind or more of a crystalline polypropylene (PP5) having an intrinsic viscosity different from the above-mentioned one, separately and similarly prepared, ② a process of obtaining crystalline polypropylenes having different intrinsic viscosities according to a multi-stage polymerization, wherein a crystalline polypropylene (PP3) having an intrinsic viscosity [η] of 2.5 to 10 dl/g is obtained at one optional stage during the multi-stage polymerization.

Further, as the crystalline polypropylene (PP3) having an intrinsic viscosity [72] of 2.5 to 10 dl/g, and one kind or more of crystalline polypropylenes (PP5) having different intrinsic viscosities from those described above, respectively constituting the crystalline polypropylene composition (PP4) used for the process for producing the polypropylene of the present invention, not only propylene homopolymer, but also random copolymers of propylene with linear monoolefins such as ethylene, butene-1, pentene-1, hexene-1, heptene-1, octene-1, etc., branched monoolefins such as 4-methylpentene-1, 2-methylpentene-1, and further, styrene, etc. are also usable.

When copolymers are used, olefins other than propylene are not limited to one kind, but it does not matter if two kinds or more of the olefins are contained. Concretely, propylene-ethylene copolymer, propylene-butene-1 copolymer, propylene-hexene-1 copolymer, propylene-octene-1 copolymer, propylene-4-methylpentene-1 copolymer, propylene-ethylene-butene-1 copolymer, propylene-ethylene-4-methylpentene-1 copolymer, etc. are mentioned.

At that time, the polymerization units of olefin other than propylene are required to be 10% by weight or less. If the units exceeds 10% by weight, gel is liable to occur in the resulting polypropylene; hence such units are outside the range of the present invention.

Further, the process for producing a crystalline polypropylene having a broad molecular weight distribution as in the case of the second invention of the present invention has no particular limitation, but various known processes are employed. For example, a process of blending two kinds or more of crystalline polypropylenes having different molecular weights, a process of producing crystalline polypropylenes having different molecular weights by means of a multi-stage polymerization, a process of polymerizing propylene by means of a plurality of catalyst components or specified ones, etc. are mentioned.

As to the form of known propylene polymerization at that time, slurry polymerization carried out by polymerizing propylene in an inert solvent, bulk polymerization employing propylene itself as solvent, gas phase polymerization carried out in a gas phase composed mainly of propylene, further, processes having combined the above processes are mentioned.

Further, as to the shape of the crystalline polypropylene or crystalline polypropylene composition (PP4), those such as powder, pellet, film, sheet, etc. are usable, but powder just after completion of the polymerization and in advance of being pelletized is of a preferred shape in the aspect of the reaction efficiency and the commercial production. As the average particle diameter of the powder, powder of about 50 μm to 1 mm is used. Smaller particle diameter is preferred in the aspect of the reaction efficiency, while larger particle diameter is preferred in the aspect of powder fluidity; hence it is preferred to suitably use powder of particle diameter depending upon the object.

Di-2-ethylhexyl peroxydicarbonate to be reacted with the crystalline polypropylene or the above (PP4) in the present invention is an organic peroxide exhibiting a decomposition temperature of 92° C. in the case of the half-life of one minute and that of 60° C. in the case of the half-life of one hour. As described later in Examples, even if similar percarbonates having similar decomposition temperatures are used, it is impossible to achieve the object of the present invention.

When the peroxydicarbonate is added to and mixed with the crystalline polypropylene or the above (PP4), it is convenient to dilute it in an inert solvent represented by hydrocarbon solvent such as toluene, xylene, isoparaffin, octane, decane, etc., in the aspect of handling or in order to uniformly carry out the reaction. As the concentration of di-2-ethylhexyl peroxydicarbonate in the solvent, about 10 to 90% by weight is used.

As to the reaction of the crystalline polypropylene or the above (PP4) with di-2-ethylhexyl peroxydicarbonate in the process of the present invention, di-2-ethylhexyl peroxydicarbonate is first added to and mixed with the crystalline polypropylene in a reaction vessel and in the atmosphere of an inert gas such as nitrogen, argon or the like. The temperature at that time is preferably 0° C. to 40° C. Further, it is preferred to agitate the above materials so as to be sufficiently mixed.

The quantity of the peroxydicarbonate added is preferably 1 to 10 mmols per 100 g of the crystalline polypropylene, more preferably 2 to 10 mmols. If its quantity used is smaller, the effect upon modification is insufficient, while if the quantity is too large, improvement in the effect is not only unexpected, but also the resulting polypropylene has a remaining smell and is so unstable as to cause a notable deterioration with lapse of time.

The mixture of the crystalline polypropylene or the above (PP4) with di-2-ethylhexyl peroxydicarbonate is successively reacted in a reaction vessel in an inert gas atmosphere, if necessary under stirring condition, at 70° to 150° C., preferably 75° to 140° C., for 5 minutes to 5 hours, preferably for 10 minutes to 3 hours.

After the reaction, the resulting material is taken out of the reaction vessel and further melt-kneaded to obtain the polypropylene of the present invention. As to the melt-kneading, known melt-kneading process is employed. For example, employing single screw extruder, twin-screw extruder, extruders having gear pump combined therewith, Brabender, Banbury mixer or the like, the polypropylene is melt-kneaded at a temperature of the melting point or higher of the polypropylene for about 10 seconds to one hour, preferably for 20 seconds to 10 minutes. By such melt-kneading, the crystallization temperature is notably elevated to exhibit the characteristic of the polypropylene of the present invention. In addition, the crystallization temperature of the polypropylene in the form of powder prior to the melt-kneading is similar to that prior to the reaction or only slightly higher.

After melt-kneaded, the resulting material is usually cut into granular form to obtain pellets which are used for various kinds of molded products, but it is also possible to process the material just after melt-kneaded into molded products. In addition, it is also possible, if necessary, to wash the material in the form of powder prior to melt-kneading, with an inert solvent, followed by drying and melt-kneading.

Further, when melt-kneading is carried out, it is possible, if necessary, to blend various kinds of additives such as antioxidant, ultraviolet light absorber, antistatic agent, nucleus-creating agent, lubricant, flame retarder, anti-blocking agent, coloring agent, inorganic or organic filler, etc., in advance of the melt-kneading.

Even according to the above-described process, it is possible to obtain the polypropylene of the present invention, but it is a preferable embodiment of the present invention to successively subject the reaction product after the reaction and before the melt-kneading, to post-heat-treatment in an inert atmosphere, if necessary under agitating condition, and at 100° to 150° C. The treating time is suitably 10 minutes to 2 hours, preferably 15 minutes to one hour. When the post-heat-treatment is carried out, the reaction efficiency is increased and also the smell of the resulting polypropylene is more reduced, and further a stabilized polypropylene having few change with lapse of time is obtained.

The objective polypropylene of the present invention is obtained according to the above process, but the polypropylene should be provided with the already described characteristics. Unless these characteristics are not satisfied, it is impossible to achieve the object of the present invention.

The thus obtained polypropylene of the present invention having a high melt-tensile strength has a high crystallization temperature together with the high melt-tensile strength and further a superior stiffness and moldability, and still further, it is possible to remelt and recycle-use molded products prepared therefrom and used. Thus, the polypropylene is suitable particularly to blow molding, foam molding and extrusion molding, but it is not only applied to such molding fields, but also applied to injection molding, T-die molding, thermoforming, etc., whereby various vessels such as hollow vessels, etc., and various molded products such as film, sheet, pipe, fiber, etc. can be produced.

The reaction mechanism by which the polypropylene of the present invention is obtained is unclear at present, but it is presumed that radicals formed from di-2-ethylhexyl peroxydicarbonate generate a certain interaction upon the polypropylene (polypropylene having a particularly broad molecular weight distribution in the case of the second invention), and further, when the polypropylene is melt-kneaded, and in the case of the polypropylene of the present invention (PP2), change of polypropylene particularly at the part of polypropylene having a higher intrinsic viscosity $[\eta]$ of 2.5 to 10 dl/g has an influence to a larger extent upon the whole of the polypropylene than change of polypropylene at the part of polypropylene having a lower intrinsic viscosity; hence there are exhibited the melting behavior and the crystallization behavior characteristic of the polypropylene of the present invention, which have not been observed in the case of known polypropylene, as the whole.

Next, the present invention will be described in more detail by way of Examples. The definitions of the terms and the measurement methods employed in Examples and Comparative examples are as follows:

(1) Intrinsic viscosity: $[\eta]$, measured according to the method described above. (Unit: dl/g).
(2) Weight average molecular weight: (Mw), measured according to the method described above.
(3) Branching coefficient: (g), measured according to the method described above.
(4) Melt-tensile strength: (MS), measured according to the method described above. (Unit: gf).
(5) Melting point: (Tm), measured according to the method described above. (Unit: ° C.).
(6) Crystallization temperature: (Tc), measured according to the method described above. (Unit: °C.)
(7) Stiffness: Polypropylene pellet was molded into a test piece of JIS form by means of an injection molding machine, at a molten resin temperature of 230° C. and a mold temperature of 50° C., followed by allowing the test piece to stand in a room in a humidity of 50% and at room temperature of 23° C. for 72 hours, and measuring the modulus in flexure according to JIS K7230. (Unit: Kgf/cm$^2$).

EXAMPLE 1

The inside of a reactor provided with a stirrer having slant blades was purged with nitrogen gas, followed by placing therein powder of a propylene homopolymer (10 Kg) having an intrinsic viscosity $[\eta]$ of 1.67 dl/g and an average particle diameter of 150 μm, obtained by subjecting propylene to slurry polymerization in n-hexane, in the presence of a catalyst having combined a titanium trichloride composition obtained according to a method of Example 1 described in Japanese patent publication No. Sho 59-28573, diethylaluminum chloride and diethylene glycol dimethyl ether as a third component.

Next, a procedure of evacuating the inside of the reactor and feeding nitrogen gas up to the atmospheric pressure was ten times repeated, followed by adding and mixing a solution of di-2-ethylhexyl peroxydicarbonate (0.35 mol) (concentration: 70% by weight in toluene), with stirring in nitrogen atmosphere at 25° C., successively raising the temperature inside the reactor up to 120° C., reacting the mixture at the same temperature for 30 minutes, thereafter further raising the temperature inside the reactor up to 135° C. and carrying out post-treatment at the same temperature for 30 minutes.

After the post-treatment, the reactor was cooled down to room temperature and then opened to obtain a polypropylene. Its melting point (Tm) and crystallization temperature (Tc) were measured to give 161.4° C. and 117.2° C., respectively. Successively, tetrakis[methylene-3-(3'-5'-di-t-butyl-4'-hydroxyphenyl)propionate]methane (0.1 part by weight) and calcium stearate (0.1 part by weight) were mixed with 100 parts by weight of the polypropylene, followed by granulating the mixture by means of an extrusion-granulator having a screw diameter of 40 mm at 230° C., to obtain pellets.

The various physical properties of the pellets were measured and evaluated. The crystallinity according to X-ray diffractometry was 64%, and the weight average molecular weight (Mw)/number average molecular weight (Mn) was 5.6. The other results are shown in Table 1.

EXAMPLES 2 and 3

Example 1 was repeated except that the intrinsic viscosity of the polypropylene used for the reaction, and the reaction conditions and post-treatment conditions were varied as shown in Table 1, to obtain polypropylene pellets.

Comparative Examples 1 to 3

The propylene homopolymer used as raw material in Examples 1 to 3 was granulated as it was, in the same manner as in Example 1, without reacting it with di-2-ethylhexyl peroxydicarbonate, to obtain pellets.

The conditions and results in Examples 1 to 3 and Comparative examples 1 to 3 are shown in Table 1.

late having a decomposition temperature of 112° C. at the time of half-life of one minute and that of 73° C. at the time of half-life of one hour.

The conditions and results of Comparative examples 4 to 6 are shown in Table 2.

TABLE 2

| Nos. of Examples and Compar. examples | Compar. ex. 4 | Compar. ex. 5 | Compar. ex. 6 |
|---|---|---|---|
| Reaction conditions | Note 2 | Note 3 | Note 4 |
| Kind of peroxide | MBPC | DIPC | TBPP |
| Amount of peroxide (mmol/100 g polymer) | 3.5 | 3.5 | 3.5 |
| Reaction temp. (°C.) | 120 | 120 | 120 |
| Reaction time (min.) | 30 | 30 | 30 |
| Treating temp. after heated (°C.) | 135 | 135 | 135 |
| Treating time after heated (min.) | 30 | 30 | 30 |
| Intrinsic viscosity of P.P. before reaction [η] (dl/g) | 1.70 | 1.67 | 1.67 |
| Polypropylene obtained | | | |
| Intrinsic viscosity [η] (dl/g) | 1.67 | 1.67 | 1.65 |
| Wt. average M.W. (Mw) × $10^{-4}$ | 31.3 | 31.4 | 31.0 |
| Branching coefficient (g) | 1.00 | 1.00 | 1.00 |
| Melt-tensile strength (MS) (gf) | 0.6 | 1.1 | 0.4 |
| M.P. (Tm) (°C.) | 161.2 | 161.3 | 161.0 |
| Crystalliz. temp. (Tc) (°C.) | 123.6 | 127.2 | 121.2 |
| % of xylene extraction residue (%) | 0.0 | 0.0 | 0.0 |
| Modulus in flexure (Kgf/cm$^2$) | 14600 | 14700 | 14500 |

Note 2 MBPC: di-3-methoxybutyl peroxydicarbonate
Note 3 DIPC: diisopropyl peroxydicarbonate
Note 4 TBPP: t-butyl peroxypivalate

TABLE 1

| Nos. of Examples and Compar. examples | Example 1 | Example 2 | Example 3 | Compar. ex. 1 | Compar. ex. 2 | Compar. ex. 3 |
|---|---|---|---|---|---|---|
| Reaction conditions | Note 1 | | | | | |
| Kind of peroxide | EHPC | EHPC | EHPC | — | — | — |
| Amount of peroxide (mmol/100 g polymer) | 3.5 | 2.0 | 7.0 | — | — | — |
| Reaction temp. (°C.) | 120 | 90 | 140 | — | — | — |
| Reaction time (min.) | 30 | 60 | 20 | — | — | — |
| Treating temp. after heated (°C.) | 135 | 140 | 120 | — | — | — |
| Treating time after heated (min.) | 30 | 20 | 60 | — | — | — |
| Intrinsic viscosity of P.P. before reaction [η] (dl/g) | 1.67 | 2.38 | 1.30 | 1.67 | 2.38 | 1.30 |
| Polypropylene obtained | | | | | | |
| Intrinsic viscosity [η] (dl/g) | 1.68 | 2.38 | 1.28 | 1.67 | 2.37 | 1.30 |
| Wt. average M.W. (Mw) × $10^{-4}$ | 31.3 | 47.0 | 23.6 | 31.4 | 46.6 | 23.7 |
| Branching coefficient (g) | 1.01 | 1.00 | 0.99 | 1.00 | 1.00 | 1.00 |
| Melt-tensile strength (MS) (gf) | 7.2 | 11.5 | 2.1 | 0.5 | 2.4 | 0.2 |
| M.P. (Tm) (°C.) | 161.8 | 161.2 | 162.0 | 161.4 | 161.2 | 161.5 |
| Crystalliz. temp. (Tc) (°C.) | 129.4 | 128.1 | 130.0 | 117.0 | 116.8 | 117.2 |
| % of xylene extraction residue (%) | 0.0 | 0.0 | 0.0 | 0.0 | 0.0 | 0.0 |
| Modulus in flexure (Kgf/cm$^2$) | 16000 | 14000 | 16500 | 14600 | 13200 | 15000 |

Note 1. EHPC: di-2-ethylhexyl peroxydicarbonate

Comparative Example 4

Example 1 was repeated except that di-2-ethylhexyl peroxydicarbonate was replaced by di-3-methoxybutyl peroxydicarbonate having a decomposition temperature of 85° C. at the time of half-life of 1 minute and that of 57° C. at the time of half-life of one hour.

Comparative Example 5

Example 1 was repeated except that di-2-ethylhexyl peroxydicarbonate was replaced by diisopropyl peroxydicarbonate having a decomposition temperature of 93° C. at the time of half-life of one minute and that of 61° C. at the time of half-life of one hour.

Comparative Example 6

Example 1 was repeated except that di-2-ethylhexyl peroxydicarbonate was replaced by t-butyl peroxypiva-

EXAMPLE 4

Polypropylene pellets were obtained in the same manner as in Example 1 except that as the polypropylene used for the reaction, there was used powder (10 Kg) of a propylene-ethylene random copolymer having an ethylene unit content of 0.2% by weight, an intrinsic viscosity [η] of 1.70 dl/g and an average particle diameter of 800 μm, obtained by subjecting propylene and ethylene to gas phase polymerization in the presence of a catalyst having combined a magnesium chloride-supported type titanium catalyst component, triethylaluminum and diisopropyldimethoxysilane as a third component, obtained according to a process described in Example 1 of Japanese patent application laid-open No. Sho 62-104812.

Comparative Example 7

Example 4 was repeated except that the propylene-ethylene random copolymer used as a raw material in Example 4 was not reacted with di-2-ethylhexyl peroxydicarbonate, and the resulting powder was granulated as it was, to obtain pellets.

Example 5

Example 1 was repeated except that the propylene homopolymer used in Example 1 was replaced by a propylene-ethylene-butene-1 random copolymer(10 Kg)having an ethylene unit content of 3.2% by weight, a butene-1 unit content of 2.5% by weight, an intrinsic viscosity $[\eta]$ of 1.60 dl/g and an average particle diameter of 190 μm, and the reaction conditions and the post-treatment conditions were varied to those shown in Table 3, to obtain polypropylene pellets.

Comparative Example 8

Example 5 was repeated except that di-2-ethylhexyl peroxydicarbonate was not reacted with the propylene-ethylene-butene-1 copolymer, used as the raw material in Example 5, and granulation was carried out and pellets were obtained in the same manner as in Example 5.

The conditions and results of Examples 4 and 5 and Comparative examples 7 and 8 are shown in Table 3.

TABLE 3

| Nos. of Examples and Compar. examples | Example 4 | Compar. ex. 7 | Example 5 | Compar. ex. 8 |
|---|---|---|---|---|
| Reaction conditions | Note 5 | | | |
| Kind of peroxide | EHPC | — | EHPC | — |
| Amount of peroxide (mmol/100 g polymer) | 3.5 | — | 3.5 | — |
| Reaction temp. (°C.) | 120 | — | 80 | — |
| Reaction time (min.) | 30 | — | 45 | — |
| Treating temp. after heated (°C.) | 135 | — | 110 | — |
| Treating time after heated (min.) | 30 | — | 60 | — |
| Intrinsic viscosity of P.P. before reaction $[\eta]$ (dl/g) | 1.70 | 1.70 | 1.60 | 1.60 |
| Polypropylene obtained | | | | |
| Intrinsic viscosity $[\eta]$ (dl/g) | 1.70 | 1.71 | 1.60 | 1.60 |
| Wt. average M.W. (Mw) $\times 10^{-4}$ | 32.0 | 32.2 | 30.3 | 30.0 |
| Branching coefficient (g) | 1.00 | 1.00 | 1.00 | 1.00 |
| Melt-tensile strength (MS) (gf) | 6.0 | 0.5 | 6.2 | 0.5 |
| M.P. (Tm) (°C.) | 162.5 | 162.0 | 135.5 | 135.6 |
| Crystalliz. temp. (Tc) (°C.) | 127.5 | 115.2 | 109.9 | 96.8 |
| % of xylene extraction residue (%) | 0.0 | 0.0 | 0.1 | 0.0 |
| Modulus in flexure (Kgf/cm$^2$) | 16400 | 15200 | 9300 | 8200 |

Note 5 EHPC: di-2-ethylhexyl peroxydicarbonate

EXAMPLE 6

The polypropylene (100 parts by weight) obtained in the same manner as in Example 1 were mixed with tetrakis[methylene-3-(3'-5'-di-t-butyl-4'-hydroxyphenyl)propionate]methane (0.1 part by weight), calcium stearate (0.1 part by weight) and talc (0.1 part by weight) as a foaming nucleator, followed by feeding the mixture into a single screw extruder having a screw diameter of 65 mm and having fixed the extruder temperature to 230° C., injecting 1,1,2,2-tetrafluorodichloroethane (22 parts by weight) as a foaming agent midway the extruder, and carrying out extrusion foam molding using a nozzle-form mold of 5 mm in diameter fitted to the extruder and at a mold temperature of 155° C. The resulting foam had a smooth surface, no abnormal bubble and uniform bubbles.

Comparative Example 9

Example 6 was repeated except that the propylene homopolymer used as as raw material of Example 1 was used as it was, in place of the polypropylene of the present invention, followed by extrusion foam molding. As a result, the resulting foam caused degassing to bring about an inferior appearance, and yet had large voids; hence it was unsatisfactory for use.

Example 7

Pellets of propylene-ethylene random copolymer obtained in the same manner as in Example 4 were subjected to extrusion-sheeting at 260° C. by means of an extruder having a screw of a diameter of 65 mm, and equipped with T-die, to obtain a sheet of 0.5 mm thick. Next, in order to evaluate the heat-vacuum moldability of the sheet in model manner, the sheet was fixed onto a frame of 40 cm square, followed by placing it in a constant temperature room at 210° C. and observing its behavior.

When the sheet was heated, it began to sag at its central part, and when it sagged by 40 mm, sagging stopped, and to the contrary, the sagged part rose. When the time further lapsed, the sheet again began to sag, and thereafter the sagging proceeded irreversibly. The above behavior of the sheet that after it once sags, the sag part rises evidenced that the sheet has a superior heating vacuum moldability.

Comparative Example 10

Example 7 was repeated except that the polypropylene of the present invention was replaced by the propylene-ethylene random copolymer obtained in the same manner as in Comparative example 7. The heating behavior of the resulting sheet was observed in the same manner as in Example 7. As a result, the sagging of the sheet remained as it was, and the behavior that the sag part rises was not observed, that is, the sheet was inferior in the heating vacuum moldability.

EXAMPLE 8

In order to use the molded product of the present invention in recycle manner, a number of test pieces for measuring the modulus in flexure were prepared in the same manner as in Example 1, and the test pieces were ground by means of a grinder to obtain a ground product of the test pieces. A polypropylene composition consisting of the above ground product (10% by weight) and polypropylene pellets obtained in the same manner as in Example 1 (90% by weight), was subjected to blow molding into a 20 l capacity kerosine can, by means of a direct blow molding machine having a screw of a diameter of 65 mm, at a molding temperature of 220° C. and a mold temperature of 20° C. As a result, a homogeneous, blow molded article having no uneven thickness was obtained from a parison without its drawdown.

Comparative Example 11

Example 8 was repeated except that the polypropylene composition pellets were replaced by the polypropylene pellets obtained in the same manner as in Comparative example 1. As a result, the parison caused a large drawdown; hence blow molding was impossible.

Example 9

The inside of a reactor provided with a stirrer having slant blades was purged with nitrogen gas, followed by placing therein powder of a propylene homopolymer powder (10 Kg) having an intrinsic viscosity [η] of 1.68 dl/g, a value (Q) of weight average molecular weight (Mw)/number average molecular weight (Mn) of 9.5 and an average particle diameter of 140 μm, obtained by subjecting propylene to slurry polymerization, in n-hexane, in the presence of hydrogen as a molecular weight-controlling agent, and in the presence of a catalyst having combined a titanium trichloride composition obtained according to a method of Example 1 described in Japanese patent publication No. Sho 59-28573, and diethylaluminum chloride in a quantity of 3 mols based upon one mol of Ti in the above titanium trichloride composition, and further, as a third component, methyl p-toluylate in a quantity of 0.8 mol based upon one mol of Ti in the above titanium trichloride composition.

Next, a procedure of evacuating the inside of the reactor and feeding nitrogen gas up to the atmospheric pressure was ten times repeated, followed by adding and mixing a solution of di-2-ethylhexyl peroxydicarbonate (0.35 mol) (concentration: 70% by weight) in toluene, with stirring in nitrogen gas atmosphere at 25° C., successively raising the temperature inside the reactor up to 120° C., reacting the mixture at the same temperature for 30 minutes, thereafter further raising the temperature inside the reactor up to 135° C. and carrying out post-treatment at the same temperature for 30 minutes.

After the post-treatment, the reactor was cooled down to room temperature and then opened to obtain polypropylene. Its melting point (Tm) and crystallization temperature (Tc) were measured to give 163.7° C. and 122.4° C., respectively. Successively, tetrakis[-methylene-3-(3'-5'-di-t-butyl-4'-hydroxyphenyl)propionate]methane (0.1 part by weight) and calcium stearate (0.1 part by weight) were mixed with 100 parts by weight of the polypropylene, followed by granulating the mixture by means of an extrusion-granulator having a screw of a diameter of 40 mm at 230° C., to obtain pellets.

The various physical properties of the pellets were measured and evaluated. The crystallinity according to X-ray diffractometry was 67%, and the weight average molecular weight (Mw)/number average molecular weight (Mn) was 9.8. The results are shown in Table 4.

Example 10 and 11

Example 9 was repeated except that the intrinsic viscosity of the polypropylene, and the reaction conditions and post-treatment conditions were varied as shown in Table 4, to obtain polypropylene pellets.

Comparative Examples 12 to 14

The propylene homopolymer used as raw material in Examples 9 to 11 was granulated as it was, in the same manner as in Example 9, without reacting it with di-2-ethylhexyl peroxydicarbonate, to obtain pellets.

Comparative Example 15

Example 9 was repeated except that when the polypropylene used as raw material was obtained in Example 9, a catalyst obtained by replacing methyl p-toluylate as the third component of the catalyst by diethylene glycol dimethyl ether in a quantity of 0.01 mol based upon one mol of Ti was used, and the quantity of hydrogen was varied, to carry out slurry polymerization of propylene. A propylene homopolymer powder having an intrinsic viscosity [η] of 1.68 dl/g and a value (Q) of weight average molecular weight (Mw)/number average molecular weight (Mn) of 5.6 was obtained.

Example 9 was repeated except that the above polypropylene (10 Kg) was used as a raw material polypropylene. This polypropylene was reacted with di-2-ethylhexyl peroxydicarbonate, followed by granulation, to obtain polypropylene pellets.

The conditions and results of Examples 9 to 11 and Comparative examples 12-15 are shown in Table 4.

TABLE 4

| Nos. of Examples and Compar. examples | Example 9 | Example 10 | Example 11 | Compar. ex. 12 | Compar. ex. 13 | Compar. ex. 14 | Compar. ex. 15 |
|---|---|---|---|---|---|---|---|
| Reaction conditions | Note 1 | | | | | | |
| Kind of peroxide | EHPC | EHPC | EHPC | — | — | — | EHPC |
| Amount of peroxide (mmol/100 g polymer) | 3.5 | 2.0 | 7.0 | — | — | — | 3.5 |
| Reaction temp. (°C.) | 120 | 90 | 140 | — | — | — | 120 |
| Reaction time (min.) | 30 | 60 | 20 | — | — | — | 30 |
| Treating temp. after heated (°C.) | 135 | 140 | 120 | — | — | — | 135 |
| Treating time after heated (min.) | 30 | 20 | 60 | — | — | — | 30 |
| Intrinsic viscosity of P.P. before reaction [η] (dl/g) | 1.68 | 2.35 | 1.26 | 1.68 | 2.35 | 1.26 | 1.68 |
| M.W. distribution (Q) (Mw)/(Mn) | 9.5 | 9.3 | 10.0 | 9.5 | 9.3 | 10.0 | 5.6 |
| Polypropylene obtained | | | | | | | |
| Intrinsic viscosity [η] (dl/g) | 1.67 | 2.33 | 1.26 | 1.67 | 2.33 | 1.26 | 1.68 |
| Wt. average M.W. (Mw) × $10^{-4}$ | 31.8 | 45.7 | 22.9 | 31.6 | 45.8 | 22.8 | 31.3 |
| M.W. distribution (Q) (Mw)/(Mn) | 9.8 | 9.3 | 10.4 | 9.4 | 9.0 | 9.8 | 5.6 |
| Branching coefficient (g) | 0.99 | 1.00 | 1.00 | 1.00 | 1.00 | 1.00 | 1.01 |
| Melt-tensile strength (MS) (gf) | 11.0 | 17.0 | 3.2 | 0.7 | 3.0 | 0.2 | 7.2 |
| M.P. (Tm) (°C.) | 163.6 | 163.5 | 163.8 | 163.8 | 163.7 | 163.8 | 161.8 |
| Crystalliz. temp. (Tc) (°C.) | 132.9 | 131.7 | 133.6 | 119.8 | 120.0 | 120.6 | 129.4 |
| % of xylene extraction residue (%) | 0.0 | 0.1 | 0.1 | 0.0 | 0.0 | 0.0 | 0.0 |
| Modulus in flexure (Kgf/cm$^2$) | 19600 | 17800 | 19900 | 18000 | 16800 | 18300 | 16000 |

Note 1: EHPC: di-2-ethylhexyl peroxydicarbonate

EXAMPLE 12

Polypropylene pellets were obtained in the same manner as in Example 9 except that propylene was subjected to a continuous, multi-stage polymerization in n-hexane, in the presence of a catalyst having combined a magnesium chloride-supported type titanium catalyst component, obtained according to a process described in Example 1 of Japanese patent application laid-open No. Sho 62-104812, triethylaluminum in a quantity of 200 mols based upon one mol of titanium in the above titanium catalyst component and as a third component, diisopropyldimethoxysilane in a quantity of 20 mols based upon one mol of titanium in the above titanium catalyst component, and employing three continuous type polymerization vessels connected in series, while keeping different hydrogen concentrations in gas phase in the respective polymerization vessels, and the resulting propylene homopolymer powder (10 Kg) was used, which has an intrinsic viscosity [$\eta$] of 1.52 dl/g, a value (Q) of weight average molecular weight (Mw)/number average molecular weight (Mn) of 12.4 and an average particle diameter of 750 $\mu$m.

Comparative Example 16

Example 12 was repeated except that the propylene homopolymer used in the reaction was not reacted with di-2-ethylhexyl peroxydicarbonate and the resulting powder was granulated as it was, to obtain pellets.

Comparative Example 17

Propylene was subjected to slurry polymerization in the same manner as in Example 12 except that when polypropylene used as raw material was obtained, a single polymerization vessel was used and the quantity of hydrogen was adjusted, to obtain a propylene homopolymer powder having an intrinsic viscosity [$\eta$] of 1.52 dl/g, and a value (Q) of weight average molecular weight (Mw)/number average molecular weight (Mn) of 5.0.

In the same manner as in Example 12 except that the above polypropylene (10 Kg) was used as raw material, the polypropylene was reacted with di-2-ethylhexyl peroxydicarbonate, followed by granulation, to obtain polypropylene pellets.

Comparative Example 18

The reaction and the post-treatment were carried out in the same manner as in Example 12 except that di-2-ethylhexyl peroxydicarbonate was replaced by di-3-methoxybutyl peroxydicarbonate having a decomposition temperature of 85° C. at the time of a half-life of one minute and that of 57° C. at the time of a half-life of one hour.

Comparative Example 19

The reaction and the post-treatment were carried out in the same manner as in Example 12 except that di-2-ethylhexyl peroxydicarbonate was replaced by diisopropyl peroxydicarbonate having a decomposition temperature of 93° C. at the time of a half-life of one minute and that of 61° C. at the time of one hour.

Comparative Example 20

The reaction and the post-treatment were carried out in the same manner as in Example 12 except that di-2-ethylhexyl peroxydicarbonate was replaced by t-butyl peroxypivalate having a decomposition temperature of 112° C. at the time of a half-life of one minute and that of 73° C. at the time of a half-life of one hour.

The conditions and results of Example 12 and Comparative examples 16 to 20 are shown in Table 5.

TABLE 5

| Nos. of Examples and Compar. examples | Example 12 | Compar. ex. 16 | Compar. ex. 17 | Compar. ex. 18 | Compar. ex. 19 | Compar. ex. 20 |
|---|---|---|---|---|---|---|
| Reaction conditions | Note 1 | | | Note 2 | Note 3 | Note 4 |
| Kind of peroxide | EHPC | — | EHPC | MBPC | DIPC | TBPP |
| Amount of peroxide (mmol/100 g polymer) | 3.5 | — | 3.5 | 3.5 | 3.5 | 3.5 |
| Reaction temp. (°C.) | 120 | — | 120 | 120 | 120 | 120 |
| Reaction time (min.) | 30 | — | 30 | 30 | 30 | 30 |
| Treating temp. after heated (°C.) | 135 | — | 135 | 135 | 135 | 135 |
| Treating time after heated (min.) | 30 | — | 30 | 30 | 30 | 30 |
| Intrinsic viscosity of P.P. before reaction [$\eta$] (dl/g) | 1.52 | 1.52 | 1.52 | 1.52 | 1.52 | 1.52 |
| M.W. distribution (Q) (Mw)/(Mn) | 12.4 | 12.4 | 5.0 | 12.4 | 12.4 | 12.4 |
| Polypropylene obtained | | | | | | |
| Intrinsic viscosity [$\eta$] (dl/g) | 1.50 | 1.50 | 1.51 | 1.51 | 1.50 | 1.50 |
| Wt. average M.W. (Mw) × $10^{-4}$ | 28.5 | 27.9 | 28.4 | 28.1 | 28.2 | 27.6 |
| M.W. distribution (Q) (Mw)/(Mn) | 12.5 | 12.0 | 5.2 | 12.2 | 12.4 | 12.2 |
| Branching coefficient (g) | 0.98 | 1.00 | 0.99 | 1.00 | 0.99 | 1.01 |
| Melt-tensile strength (MS) (gf) | 6.4 | 0.4 | 3.5 | 0.5 | 0.9 | 0.4 |
| M.P. (Tm) (°C.) | 164.0 | 163.8 | 164.5 | 163.8 | 164.0 | 163.8 |
| Crystalliz. temp. (Tc) (°C.) | 132.7 | 120.3 | 130.8 | 125.5 | 130.0 | 124.4 |
| % of xylene extraction residue (%) | 0.0 | 0.0 | 0.0 | 0.0 | 0.0 | 0.0 |
| Modulus in flexure (Kgf/cm$^2$) | 19000 | 17500 | 16600 | 17600 | 17700 | 17600 |

Note 1 EHPC: di-2-ethylhexyl peroxydicarbonate
Note 2 MBPC: di-3-methoxybutyl peroxydicarbonate
Note 3 DIPC: diisopropyl peroxydicarbonate
Note 4 TBPP: t-butyl peroxypivalate

EXAMPLE 13

Polypropylene pellets were obtained in the same manner as in Example 12 except that the polypropylene used for the reaction is a propylene-ethylene random copolymer powder (10 Kg) having an ethylene unit content of 0.2% by weight, an intrinsic viscosity [$\eta$] of 1.70 dl/g, a value (Q) of weight average molecular weight (Mw)/number average molecular weight (Mn) of 8.0 and an average particle diameter of 780 $\mu$m, obtained by carrying out propylene-ethylene copolymerization in the presence of the same catalyst as in Example 12 and under polymerization conditions where a high molecular weight polymer was formed by bulk polymerization at the first step, followed by successively carrying out gas phase polymerization in the same polymerization vessel to form a low molecular weight polymer.

Comparative Example 21

The propylene-ethylene random copolymer used as a raw material in Example 13 was granulated in the same manner as in Example 13, but as it was, that is, without reacting it with di-2-ethylhexyl peroxydicarbonate, to obtain pellets.

Comparative Example 22

Example 13 was repeated except that when the polypropylene used as the raw material was prepared, bulk polymerization was carried out at one stage, not at a multi-stage, and the quantities of ethylene and hydrogen were adjusted, to obtain a propylene-ethylene random copolymer powder having an ethylene unit content of 0.2% by weight, an intrinsic viscosity [η] of 1.72 dl/g and a value (Q) of weight average molecular weight (Mw)/number average molecular weight (Mn) of 4.8.

In the same manner as in Example 13 except that the above polypropylene (10 Kg) was used as raw material polypropylene, the polypropylene was reacted with di-2-ethylhexyl peroxydicarbonate, followed by granulation to obtain polypropylene pellets.

EXAMPLE 14

Example 12 was repeated except that propylene-ethylene-butene-1 copolymerization was continuously carried out using the same catalyst as in Example 12, employing two continuous type gas phase polymerization vessels connected in series, while keeping the hydrogen concentrations in the respective, different gas phases in the respective polymerization vessels to obtain a propylene-ethylene-butene-1 random copolymer powder(10 Kg) having an ethylene unit content of 3.2% by weight and a butene-1 unit content of 2.5% by weight, an intrinsic viscosity [η] of 1.60 dl/g, a value (Q) of weight average molecular weight (Mw)/number average molecular weight (Mn) of 7.8 and an average particle diameter of 770 μm, and Example 9 was repeated except that the reaction conditions and the post-treatment conditions were varied as described in Table 6, to obtain polypropylene pellets.

Comparative Example 23

Example 14 was repeated except that di-2-ethylhexyl peroxydicarbonate was not reacted with the propylene-ethylene-butene-1 random copolymer used as the raw material, and the resulting copolymer powder, as it was, was granulated in the same manner as in Example 13, to obtain pellets.

Comparative Example 24

Example 14 was repeated except that when polypropylene used as raw material was obtained, gas phase polymerization was carried out at one stage, not at a multi-stage, and Example 13 was repeated except that the quantities of ethylene and butene-1 and the hydrogen concentration were adjusted, to obtain a propylene-ethylene-butene-1 random copolymer powder having an ethylene unit content of 3.2% by weight, a butene-1 unit content of 2.5% by weight, an intrinsic viscosity [η] of 1.60 dl/g and a value (Q) of weight average molecular weight (Mw)/number average molecular weight (Mn) of 4.1.

In the same manner as in Example 14 except that the polypropylene (10 Kg) was used as raw material polypropylene, the polypropylene was reacted with di-2-ethylhexyl peroxydicarbonate, followed by granulation, to obtain polypropylene pellets.

The conditions and results of Example 13 and 14 and Comparative examples 21 to 24 are shown in Table 6.

TABLE 6

| Nos. of Examples and Compar. examples | Example 13 | Compar. ex. 21 | Compar. ex. 22 | Example 14 | Compar. ex. 23 | Compar. ex. 24 |
|---|---|---|---|---|---|---|
| Reaction conditions | Note 1 | | | | | |
| Kind of peroxide | EHPC | — | EHPC | EHPC | — | EHPC |
| Amount of peroxide (mmol/100 g polymer) | 3.5 | — | 3.5 | 3.5 | — | 3.5 |
| Reaction temp. (°C.) | 120 | — | 120 | 80 | — | 80 |
| Reaction time (min.) | 30 | — | 30 | 45 | — | 45 |
| Treating temp. after heated (°C.) | 135 | — | 135 | 110 | — | 110 |
| Treating time after heated (min.) | 30 | — | 30 | 60 | — | 60 |
| Intrinsic viscosity of P.P. before reaction [η] (dl/g) | 1.70 | 1.71 | 1.72 | 1.60 | 1.60 | 1.60 |
| M.W. distribution (Q) (Mw)/(Mn) | 8.0 | 8.0 | 4.8 | 7.8 | 7.8 | 4.1 |
| Polypropylene obtained | | | | | | |
| Intrinsic viscosity [η] (dl/g) | 1.71 | 1.71 | 1.70 | 1.60 | 1.59 | 1.60 |
| Wt. average M.W. (Mw) × $10^{-4}$ | 31.9 | 32.3 | 32.0 | 30.0 | 29.7 | 30.3 |
| M.W. distribution (Q) (Mw)/(Mn) | 8.2 | 8.0 | 4.8 | 7.9 | 7.6 | 4.2 |
| Branching coefficient (g) | 1.01 | 1.00 | 1.00 | 1.00 | 1.00 | 1.00 |
| Melt-tensile strength (MS) (gf) | 9.2 | 0.6 | 5.7 | 7.4 | 0.5 | 5.0 |
| M.P. (Tm) (°C.) | 162.0 | 162.1 | 162.6 | 139.2 | 139.4 | 139.5 |
| Crystalliz. temp. (Tc) (°C.) | 130.0 | 119.2 | 127.0 | 116.2 | 101.2 | 103.7 |
| % of xylene extraction residue (%) | 0.0 | 0.0 | 0.0 | 0.1 | 0.0 | 0.1 |
| Modulus in flexure (Kgf/cm$^2$) | 17800 | 16400 | 15700 | 11300 | 10100 | 10100 |

Note 1 EHPC: di-2-ethylhexyl peroxydicarbonate

EXAMPLE 15

In the same manner as in Example 9, di-2-ethylhexyl peroxydicarbonate was reacted with the raw material polypropylene, followed by mixing with the resulting polypropylene powder (100 parts by weight), tetrakis[methylene-3-(3'-5'-di-t-butyl-4'-hydroxyphenyl)propionate]methane (0.1 part by weight), calcium stearate (0.1 part by weight) and talc as a foaming nucleator (0.1 part by weight), feeding the mixture into a single screw extruder having a screw diameter of 65 mm and having the extruder temperature set to 230° C., pressurizing 1,1,2,2-tetrafluorodichloroethane (22 parts by weight) as a foaming agent midway the extruder, and carrying out extrusion-foam molding by means of a nozzle-form mold of 5 mm in diameter, fitted into the extruder, at a mold temperature of 155° C. The resulting foam had a smooth surface and uniform bubbles without abnormal bubbles.

Comparative Example 25

Extrusion-foam molding was carried out in the same manner as in Example 15 except that in place of the polypropylene powder obtained by reacting di-2-ethylhexyl peroxydicarbonate, the propylene homopolymer used as raw material when the polypropylene powder was obtained was used as it was. The thus obtained foam caused degassing, resulting in an inferior appearance, and yet there occurred large voids; thus the foam was so unsatisfactory for use.

EXAMPLE 16

Propylene-ethylene random copolymer pellets obtained in the same manner as in Example 13 were subjected to extrusion-sheeting at 260° C. by means of an extruder having a screw of a diameter of 65 mm, and equipped with T-die, to obtain a sheet of 0.5 mm thick. Next, in order to evaluate the heat-vacuum moldability of the sheet in model manner, the sheet was fixed onto a frame of 40 cm square and placed in a constant temperature room at 210° C. to observe its behavior.

When the sheet was heated, it began to sag at its central part, and when it sagged by 31 mm, sagging stopped, and to the contrary, the sagged part rose. When 20 seconds lapsed after the stop of sagging, the sheet again began to sag, and thereafter the sagging proceeded irreversibly. The quantity of sagging was small and the time which lapsed by the beginning of resagging was as long as 20 seconds; thus, it was found that the sheet was far superior in the heat-vacuum moldability.

Comparative Example 26

Example 16 was repeated except that the pellets of the polypropylene of the present invention were replaced by those of a propylene-ethylene random copolymer obtained in the same manner as in Comparative example 22, to obtain a sheet. The heating behavior of the sheet was observed in the same manner as in Example 16. As a result, sagging stopped at a distance of 40 mm, and the period which lapsed by the start of re-sagging was as short as 8 seconds; thus, the sheet was inferior in the heat-vacuum moldability as compared with that of Example 16.

EXAMPLE 17

In order to use the molded product of the present invention in recycle manner, a number of test pieces for measuring the modulus in flexure were prepared in the same manner as in Example 9, and the test pieces were ground by means of a grinder to obtain a ground product of the test pieces. A polypropylene composition consisting of the above ground product (10% by weight) and polypropylene pellets obtained in the same manner as in Example 9 (90% by weight), was subjected to blow molding into a 100 l capacity kerosine can, by means of a direct blow molding machine having a screw diameter of 65 mm, at a molding temperature of 230° C. and a mold temperature of 20° C. As a result, a homogeneous, blow molded article having no uneven thickness was obtained from a parison without its drawdown.

Comparative Example 27

Blow molding was carried out in the same manner as in Example 17 except that polypropylene pellets obtained in the same manner as in Comparative example 12 were used as polypropylene. As a result, the parison caused a large drawdown; hence blow molding was impossible.

Comparative Example 28

Blow molding was carried out in the same manner as in Example 17 except that polypropylene pellets obtained in the same manner as in Comparative example 15 were used as polypropylene. As a result, the parison caused drawdown to form a heterogeneous blow-molded product having an uneven thickness.

EXAMPLE 18

Propylene was subjected to a continuous, multistage polymerization in n-hexane, using a catalyst having combined a titanium trichloride composition obtained according to a process disclosed in Example 1 of Japanese patent publication No. Sho 59-28573, and diethylaluminum chloride and further, diethylene glycol dimethyl ether as a third component, and employing three, continuous type slurry polymerization vessels connected in series, maintaining different hydrogen concentrations in gas phase in the respective polymerization vessels, so as to give an intrinsic viscosity $[\eta]$ of polymer of 1.00 dl/g and a polymerized quantity of 50% by weight based upon the total polymerized quantity, in the first stage polymerization vessel, and so as to give an intrinsic viscosity $[\eta]$ of polymer formed at the second stage, of 1.50 dl/g and a polymerized quantity of 30% by weight at the second stage based upon the total polymerized quantity, in the second stage polymerization vessel, and further, so as to give an intrinsic viscosity $[\eta]$ of polymer formed at the third stage, of 3.65 dl/g and a polymerized quantity of 20% by weight at the third stage based upon the total polymerized quantity, to thereby obtain a propylene homopolymer powder having an intrinsic viscosity $[\eta]$ of 1.68 dl/g, a stereospecifity [II] of 96% and an average particle diameter of 140 μm. This powder was, as it was, rendered as a polypropylene composition (PP4) used in the process of the present invention.

Successively, the polypropylene composition (PP4) (10 Kg) was placed in a reactor equipped with a stirrer and purged with nitrogen gas, followed by ten times repeating an operation of evacuating the inside of the reactor and feeding nitrogen gas up to the atmospheric pressure, adding di-2-ethylhexyl peroxydicarbonate (0.35 mol) having a concentration in toluene solution, of 70% by weight, with stirring, in a nitrogen gas atmosphere and at 25° C., successively raising the temperature inside the reaction vessel up to 120° C., reacting them at the same temperature for 30 minutes, further raising the temperature inside the reactor up to 135° C. after lapse of the reaction period, carrying out post-treatment at the same temperature for 30 minutes, cooling the reactor down to room temperature after the post-treatment and opening the reactor, to obtain a polypropylene.

The melting point (Tm) and the crystallization temperature (Tc) were measured to give 161.7° C. and 117.5° C., respectively. Successively, tetrakis[methylene-3-(3'-5'-di-t-butyl-4'-hydroxyphenyl)propionate]methane (0.1 part by weight) and calcium stearate (0.1 part by weight) based upon 100 parts by weight of the polypropylene were mixed with the polypropylene, followed by granulating the mixture by means of an extrusion-granulator having a screw of 40 mm in diameter, at 230° C., to obtain a polypropylene (PP2) according to the process of the present invention, in the form of pellets, and various physical properties of the pellets were measured.

EXAMPLE 19 and 20

Example 18 was repeated except that at the time of obtaining the polypropylene composition (PP4) used for the reaction, a polypropylene obtained by slurry polymerization at two stages employing two continuous type slurry polymerization vessels connected in series was used and the intrinsic viscosity of the polypropylene and the reaction conditions and the post-treatment conditions were varied as shown in Table 7, to obtain polypropylene pellets (PP2).

Comparative Example 29

In Example 18, di-2-ethylhexyl peroxydicarbonate was not reacted with the polypropylene composition (PP4) used for the reaction, and the resulting material was, as it was, granulated as in Example 18 to obtain pellets.

Comparative Example 30

In Example 18, at the time of obtaining a propylene homopolymer used as raw material, propylene was continuously polymerized under a multistage in n-hexane, varying a hydrogen concentration so as to give an intrinsic viscosity [$\eta$] of the polymer formed at the first stage, of 1.50 dl/g, an intrinsic viscosity [$\eta$] of the polymer formed at the second stage, of 1.82 dl/g and an intrinsic viscosity [$\eta$] of the polymer formed at the third stage, of 1.92 dl/g, to obtain a propylene homopolymer powder having an intrinsic viscosity [$\eta$] of 1.68 dl/g.

Example 18 was repeated except that the above polypropylene (10 Kg) was used as raw material polypropylene, followed by reacting it with di-2-ethylhexyl peroxydicarbonate, and granulating to obtain polypropylene pellets.

Comparative Example 31

In Example 18, at the time of obtaining the propylene homopolymer used as raw material, propylene was subjected to slurry polymerization in the same manner as in Example 18, except that propylene was polymerized using one polymerization vessel without polymerizing propylene under a multistage, and the quantity of hydrogen was varied, to obtain a propylene homopolymer powder having an intrinsic viscosity of 1.68 dl/g. The above polypropylene was reacted with di-2-ethylhexyl peroxydicarbonate in the same manner as in Example 18 except that the polypropylene (10 Kg) was used as raw material, followed by granulation to obtain polypropylene pellets.

The conditions and the results of Examples 18 to 20 and Comparative examples 29 to 31 are shown in Table 7.

TABLE 7

| Nos. of Examples and Compar. examples | Example 18 | Example 19 | Example 20 | Compar. ex. 29 | Compar. ex. 30 | Compar. ex. 31 |
|---|---|---|---|---|---|---|
| Reaction conditions | Note 1 | | | | | |
| Kind of peroxide | EHPC | EHPC | EHPC | — | EHPC | EHPC |
| Amount of peroxide (mmol/100 g polymer) | 3.5 | 2.0 | 7.0 | — | 3.5 | 3.5 |
| Reaction temp. (°C.) | 120 | 90 | 140 | — | 120 | 120 |
| Reaction time (min.) | 30 | 60 | 20 | — | 30 | 30 |
| Treating temp. after heated (°C.) | 135 | 140 | 120 | — | 135 | 135 |
| Treating time after heated (min.) | 30 | 20 | 60 | — | 30 | 30 |
| P.P. (PP3) | | | | | | |
| Intrinsic viscosity [$\eta$] (dl/g) | 3.65 | 4.90 | 2.60 | 3.65 | (1.92) | — |
| Proportion by wt. (%) | 20 | 35 | 30 | 20 | (20) | — |
| P.P. composition (PP4) | | | | | | |
| Intrinsic viscosity [$\eta$] (dl/g) | 1.68 | 2.35 | 1.52 | 1.68 | 1.68 | 1.68 |
| Polypropylene obtained | | | | | | |
| Intrinsic viscosity [$\eta$] (dl/g) | 1.67 | 2.34 | 1.52 | 1.67 | 1.67 | 1.68 |
| Wt. average M.W. (Mw) $\times 10^{-4}$ | 31.8 | 45.9 | 28.0 | 31.6 | 31.6 | 31.3 |
| Branching coefficient (g) | 0.99 | 1.00 | 1.01 | 1.00 | 1.00 | 1.01 |
| Melt-tensile strength (MS) (gf) | 10.5 | 16.0 | 5.0 | 0.6 | 7.4 | 7.0 |
| M.P. (Tm) (°C.) | 161.6 | 161.0 | 161.8 | 161.8 | 161.7 | 161.8 |
| Crystalliz. temp. (Tc) (°C.) | 130.0 | 128.2 | 130.2 | 119.8 | 129.6 | 129.4 |
| % of xylene extraction residue (%) | 0.0 | 0.1 | 0.0 | 0.0 | 0.0 | 0.0 |
| Modulus in flexure (Kgf/cm$^2$) | 18600 | 17000 | 18800 | 16100 | 16400 | 16000 |

Note 1 EHPC: di-2-ethylhexyl peroxydicarbonate

EXAMPLE 21

Propylene was continuously subjected to a gas phase polymerization at two sets using a catalyst consisting of an MgCl$_2$-supported Ti catalyst component obtained according to a process disclosed in Example 1 Japanese patent application laid-open No. Sho 62-104812, and triethylaluminum and further, diisopropyldimethoxysilane as a third component, and employing two, continuous type, gas phase polymerization vessels, and keeping different hydrogen concentrations in gas phase in the respective polymerization vessels, so as to give an intrinsic viscosity [$\eta$] of the polymer in the first stage polymerization vessel, of 4.10 dl/g and a polymerized quantity at the first stage of 30% by weight based upon the total polymerized quantity and an intrinsic viscosity [$\eta$] of the polymer in the second stage polymerization vessel, of 0.76 dl/g and a polymerized quantity at the second stage of 70% by weight based upon the total polymerized quantity, to thereby obtain a propylene homopolymer powder having an intrinsic viscosity [$\eta$] of 1.76 dl/g, a stereospecifity (II) of 98% and an average particle diameter of 780 $\mu$m.

Polypropylene pellets (PP2) were obtained in the same manner as in Example 18 except that the above propylene homopolymer (10 Kg) was used for polypropylene composition (PP4).

Comparative Example 32

Example 21 was repeated except that di-2-ethylhexyl peroxydicarbonate was not reacted with the propylene homopolymer (PP4) used for the reaction, followed by granulating the homopolymer as it was, in the same manner as in Example 21, to obtain pellets.

Comparative Example 33

Example 21 was repeated except that at the time of obtaining polypropylene used as raw material, one polymerization vessel was used and the quantity of hydrogen was adjusted, to subject propylene to gas phase polymerization, whereby a propylene homopolymer/powder having an intrinsic viscosity $[\eta]$ of 1.76 dl/g was obtained.

Example 21 was repeated except that the above polypropylene (10 Kg) was used as raw material polypropylene, followed by reacting it with di-2-ethylhexyl peroxydicarbonate and granulating as in Example 21, to obtain polypropylene pellets.

Comparative Example 34

Example 21 was repeated except that di-2-ethylhexyl peroxydicarbonate was replaced by di-3-methoxybutyl peroxydicarbonate having a decomposition temperature of 85° C. at the time of the half-life of one minute and that of 57° C. at the time of the half-life of one hour, followed by reaction and post-treatment as in Example 21.

Comparative Example 35

Example 21 was repeated except that di-2-ethylhexyl peroxydicarbonate was replaced by diisopropyl peroxydicarbonate having a decomposition temperature of 93° C. at the time of the half-life of one minute and that of 61° C. at the time of the half-life of one hour, followed by reaction and post-treatment as in Example 21.

Comparative Example 36

Example 21 was repeated except that di-2-ethylhexyl peroxydicarbonate was replaced by t-butyl peroxypivalate having a decomposition temperature of 112° C. at the time of the half-life of one minute and that of 73° C. at the time of the half-life of one hour, followed by reaction and post-treatment as in Example 21.

The conditions and the results of Example 21 and Comparative examples 32 to 36 are shown in Table 8.

TABLE 8

| Nos. of Examples and Compar. examples | Example 21 | Compar. ex. 32 | Compar. ex. 33 | Compar. ex. 34 | Compar. ex. 35 | Compar. ex. 36 |
|---|---|---|---|---|---|---|
| Reaction conditions | Note 1 | | | Note 2 | Note 3 | Note 4 |
| Kind of peroxide | EHPC | — | EHPC | MBPC | DIPC | TBPP |
| Amount of peroxide (mmol/100 g polymer) | 3.5 | — | 3.5 | 3.5 | 3.5 | 3.5 |
| Reaction temp. (°C.) | 120 | — | 120 | 120 | 120 | 120 |
| Reaction time (min.) | 30 | — | 30 | 30 | 30 | 30 |
| Treating temp. after heated (°C.) | 135 | — | 135 | 135 | 135 | 135 |
| Treating time after heated (min.) | 30 | — | 30 | 30 | 30 | 30 |
| P.P. (PP3) | | | | | | |
| Intrinsic viscosity $[\eta]$ (dl/g) | 4.10 | 4.10 | — | 4.10 | 4.10 | 4.10 |
| Proportion by wt. (%) | 30 | 30 | — | 30 | 30 | 30 |
| P.P. composition (PP4) | | | | | | |
| Intrinsic viscosity $[\eta]$ (dl/g) | 1.76 | 1.76 | 1.76 | 1.76 | 1.76 | 1.76 |
| Polypropylene obtained | | | | | | |
| Intrinsic viscosity $[\eta]$ (dl/g) | 1.76 | 1.75 | 1.75 | 1.75 | 1.74 | 1.74 |
| Wt. average M.W. (Mw) $\times 10^{-4}$ | 34.1 | 33.3 | 33.5 | 33.3 | 33.3 | 32.6 |
| Branching coefficient (g) | 0.98 | 1.00 | 0.99 | 1.00 | 0.99 | 1.01 |
| Melt-tensile strength (MS) (gf) | 11.3 | 0.4 | 6.6 | 0.5 | 0.9 | 0.4 |
| M.P. (Tm) (°C.) | 163.7 | 163.8 | 163.9 | 163.5 | 163.7 | 163.5 |
| Crystalliz. temp. (Tc) (°C.) | 132.8 | 120.4 | 130.8 | 125.6 | 130.0 | 124.5 |
| % of xylene extraction residue (%) | 0.0 | 0.0 | 0.0 | 0.0 | 0.0 | 0.0 |
| Modulus in flexure (Kgf/cm$^2$) | 18600 | 17000 | 16100 | 17000 | 17100 | 17000 |

Note 1 EHPC: di-2-ethylhexyl peroxydicarbonate
Note 2 MBPC: di-3-methoxybutyl peroxydicarbonate
Note 3 DIPC: diisopropyl peroxydicarbonate
Note 4 TMPP: t-butyl peroxypivalate

EXAMPLE 22

At the first stage polymerization, a propylene-ethylene random copolymerization by way of bulk polymerization was carried out using the same catalyst as in Example 21, so as to give an intrinsic viscosity $[\eta]$ of the resulting polymer of 3.37 dl/g, a polymerized quantity at the first stage of 35% by weight based upon the total polymerized quantity, and an ethylene unit content of 0.2% by weight. Successively, at the second stage polymerization, a propylene-ethylene random copolymerization by way of gas phase polymerization was carried out in the same polymerization vessel, so as to give an intrinsic viscosity $[\eta]$ of the polymer formed at the second stage, of 0.80 dl/g, a polymerized quantity at the second stage, of 65% by weight based upon the total polymerized quantity, and an ethylene unit content of 0.2% by weight. The thus obtained propylene-ethylene random copolymer powder had an intrinsic viscosity $[\eta]$ of 1.70 dl/g, an ethylene unit content of 0.2% by weight and an average particle diameter of 740 μm. Polypropylene pellets were obtained in the same manner as in Example 21 except that the above powder (10 Kg) was used for polypropylene composition (PP4).

Comparative Example 37

Example 22 was repeated except that di-2-ethylhexyl peroxydicarbonate was not reacted with the propylene-ethylene random copolymer (PP4) used as a raw material, followed by granulation at it was, in the same manner as in Example 22, to obtain pellets.

Comparative Example 38

Example 22 was repeated except that at the time of obtaining the polypropylene composition (PP4) used as raw material, a multi-stage polymerization was not carried out, but one stage bulk polymerization was carried out, and the quantities of ethylene and hydrogen were adjusted, to carry out propylene-ethylene copolymerization, and thereby obtain a propylene-ethylene random copolymer powder having an intrinsic viscosity $[\eta]$ of 1.70 dl/g and an ethylene unit content of 0.2% by weight. Example 22 was repeated except that the above powder (10 Kg) was used as raw material polypropylene. Namely, the powder was reacted with di-2-ethylhexyl peroxydicarbonate, followed by granulation in the same manner as in Example 22, to obtain polypropylene pellets.

EXAMPLE 23

Propylene, ethylene and butene-1 copolymerization was carried out in n-hexane, using the same catalyst as in Example 21 and employing a batch type slurry polymerization vessel, to obtain a propylene-ethylene-butene-1 random copolymer powder having an ethylene unit content of 3.2% by weight, a butene-1 unit content of 2.5% by weight and an intrinsic viscosity $[\eta]$ of 3.52 dl/g. According to the same polymerization process, two kinds of propylene-ethylene-butene-1 random copolymer powders were separately obtained: The two kinds had an ethylene unit content of 3.2% by weight, a butene-1 unit content of 2.5% by weight and an intrinsic viscosity $[\eta]$ of 2.21 dl/g, and an intrinsic viscosity $[\eta]$ of 1.50 dl/g. Polypropylene pellets (PP2) were obtained in the same manner as in Example 21 except that a blend of the copolymer having an intrinsic viscosity $[\eta]$ of 3.52 dl/g (0.5 Kg), the copolymer having an intrinsic viscosity $[\eta]$ of 2.21 dl/g (1.5 Kg) and the copolymer having an intrinsic viscosity $[\eta]$ of 1.50 dl/g (8 Kg) was used as a polypropylene composition (PP4), and the reaction conditions and the post-treatment conditions were varied as shown in Table 9.

Comparative Example 39

The propylene-ethylene-butene-1 random copolymer blend (PP4) used as raw material in Example 23 was not reacted with di-2-ethylhexyl peroxydicarbonate, but it was granulated, as it was, in the same manner as in Example 23, to obtain pellets.

Comparative Example 40

According to the same polymerization process as in Example 23, a propylene-ethylene-butene-1 random copolymer powder having an ethylene unit content of 3.2% by weight, a butene unit content of 2.5% by weight and an intrinsic viscosity $[\eta]$ of 1.71 dl/g was obtained. Polypropylene pellets were obtained in the same manner as in Example 23 except that the above copolymer was used in place of the polypropylene composition (PP4)

The conditions and the results of Examples 22 and 23 and Comparative examples 37 to 40 are shown in Table 9.

TABLE 9

| Nos. of Examples and Compar. examples | Example 22 | Compar. ex. 37 | Compar. ex. 38 | Example 23 | Compar. ex. 39 | Compar. ex. 40 |
| --- | --- | --- | --- | --- | --- | --- |
| Reaction conditions | Note 1 | | | | | |
| Kind of peroxide | EHPC | — | EHPC | EHPC | — | EHPC |
| Amount of peroxide (mmol/100 g polymer) | 3.5 | — | 3.5 | 3.5 | — | 3.5 |
| Reaction temp. (°C.) | 120 | — | 120 | 80 | — | 80 |
| Reaction time (min.) | 30 | — | 30 | 45 | — | 45 |
| Treating temp. after heated (°C.) | 135 | — | 135 | 110 | — | 110 |
| Treating time after heated (min.) | 30 | — | 30 | 60 | — | 60 |
| P.P. (PP3) | | | | | | |
| Intrinsic viscosity $[\eta]$ (dl/g) | 3.37 | 3.37 | — | 3.52 | 3.52 | — |
| roportion by wt. (%) | 35 | 35 | — | 5 | 5 | — |
| P.P. composition (PP4) | | | | | | |
| Intrinsic viscosity $[\eta]$ (dl/g) | 1.70 | 1.70 | 1.70 | 1.71 | 1.71 | 1.71 |
| Polypropylene obtained | | | | | | |
| Intrinsic viscosity $[\eta]$ (dl/g) | 1.70 | 1.70 | 1.70 | 1.69 | 1.70 | 1.70 |
| Wt. average M.W. (Mw) $\times 10^{-4}$ | 31.7 | 32.1 | 32.1 | 31.9 | 32.1 | 32.1 |
| Branching coefficient (g) | 1.01 | 1.00 | 1.00 | 1.00 | 1.00 | 1.00 |
| Melt-tensile strength (MS) (gf) | 8.7 | 0.6 | 5.7 | 8.0 | 0.5 | 5.8 |
| M.P. (Tm) (°C.) | 162.0 | 162.1 | 162.6 | 139.0 | 139.2 | 139.2 |
| Crystalliz. temp. (Tc) (°C.) | 130.0 | 119.0 | 127.0 | 116.0 | 101.0 | 113.5 |
| % of xylene extraction residue (%) | 0.0 | 0.0 | 0.0 | 0.1 | 0.0 | 0.1 |
| Modulus in flexure (Kgf/cm$^2$) | 17400 | 16000 | 15700 | 10400 | 9400 | 9600 |

Note 1 EHPC: di-2-ethylhexyl peroxy-di-carbonate

EXAMPLE 24

In the same manner as in Example 18, tetrakis[methylene-3-(3'-5'-di-t-butyl-4'-hydroxyphenyl)propionate]methane (0.1 part by weight), calcium stearate (0.1 part by weight) and talc (0.1 part by weight) as a foaming nucleator were blended with a polypropylene powder (100 parts by weight) obtained by reacting di-2-ethylhexyl peroxydicarbonate with raw material polypropylene composition (PP4), followed by feeding the blend into a single screw extruder having a screw of a diameter of 65 mm and having set the extruder temperature to 230° C., pressurizing 1,1,2,2-tetrafluorodichloroethane (22 parts by weight) as a foaming agent midway the extruder, and carrying out an extrusion-foam molding using a nozzle-form mold of 5 mm in diameter, fitted into the extruder, and at a mold temperature of 155° C. The resulting foam had a smooth surface, and uniform bubbles without abnormal ones.

Comparative Example 41

Extrusion-foam molding was carried out in the same manner as in Example 24 except that in place of the polypropylene powder obtained by reacting di-2-ethylhexyl peroxydicarbonate, the polypropylene composition (PP4) used as raw material at the time of obtaining the polypropylene powder was used as it was. The resulting foam caused degassing, exhibited an inferior appearance and had large voids; thus it was unsatisfactory for use.

EXAMPLE 25

The propylene-ethylene random copolymer pellets (PP2) obtained in the same manner as in Example 22 were subjected to extrusion-sheeting at 260° C. by means of an extruder of a screw diameter of 65 mm equipped with a T-die, to obtain a sheet of 0.5 mm thick. Next, in order to evaluate the heat-vacuum moldability of the sheet in a model manner, the sheet was fixed onto a frame of 40 cm square, followed by placing it in a constant temperature room at 210° C. and observing its behavior. When the sheet was heated, it began to sag at its central part, and when it sagged by 33 mm, sagging stopped, and to the contrary, the sagging part rose. When 16 seconds lapsed after the stop of sagging, the sheet again began to sag and thereafter the sagging proceeded irreversibly. The quantity of sagging was small and the time which lapsed by the beginning of resagging was as long as 16 seconds; thus it was found that the sheet was far superior in the heat-vacuum moldability.

Comparative Example 42

Example 25 was repeated except that the pellets of the propylene-ethylene random copolymer (PP2) obtained according to the process of the present invention were replaced by those of propylene-ethylene random copolymer obtained in the same manner as in Comparative example 38, to obtain a sheet. The heating behavior of the sheet was observed in the same manner as in Example 25. Sagging stopped at 40 mm and the period which lapsed by start of resagging was as short as 8 seconds; thus, the sheet was inferior in the heat-vacuum moldability as compared with that of Example 25.

EXAMPLE 26

In order to use the molded product of the present invention in recycle manner, a number of test pieces for measuring the modulus in flexure were prepared in the same manner as in Example 18, and the test pieces for injection molding were ground by means of a grinder to obtain a ground product of the test pieces. A polypropylene composition consisting of the above ground product (10% by weight) and polypropylene pellets obtained in the same manner as in Example 18 (90% by weight), was subjected to blow molding into a 100 l capacity kerosine can, by means of a direct blow molding machine having a screw diameter of 65 nun, at a molding temperature of 230° C. and a mold temperature of 20° C. As a result, a homogeneous, blow molded article having no uneven thickness was obtained from a parison without its drawdown.

Comparative Example 43

Blow molding was carried out in the same manner as in Example 26 except that polypropylene pellets obtained in the same manner as in Comparative example 30 were used as polypropylene. As a result, the parison caused drawdown, and a heterogeneous blow-molded product having an uneven thickness was obtained. Effectiveness of the Invention As apparent from the above-described Examples, the polypropylene of the present invention has a very high melt-tensile strength and crystallization temperature and also a superior stiffness and moldability; hence the polypropylene can broaden the restricted application fields of conventional polypropylene.

What we claim is:

1. A process for producing a polypropylene having a high melt-tensile strength, which process comprises mixing 1 to 10 millimols of di-2-ethylhexyl peroxydicarbonate with 100 g of a linear, crystalline polypropylene in an inert gas atmosphere, followed by reacting the mixture at 70° to 150° C. for 10 minutes to 3 hours and then melt-kneading the reaction material, the resulting polypropylene being a linear, crystalline polypropylene having a branching coefficient of substantially 1, and satisfying (A) a relationship between a melt-tensile strength (MS) at 230° C. and an intrinsic viscosity $[\eta]$ measured in tetralin at 135° C., expressed by the expression $$\log (MS) > 4.24 \times \log [\eta] - 0.843,$$

and (B) a relationship between a recrystallization temperature (Tc) measured by means of a differential scanning calorimeter (DSC) and a melting point (Tm), expressed by the expression $$(Tc) > 0.784 \times (Tm) - 4.00,$$

and having (C) a percentage of boiling xylene-extraction residue of 1% by weight or less.

2. A process according to claim 1, wherein said crystalline polypropylene is propylene homopolymer.

3. A process according to claim 1, wherein said crystalline polypropylene is a propylene-olefin random copolymer containing 10% by weight or less of polymerization units of an olefin other than propylene.

4. A process according to claim 1, wherein, after the reaction of the crystalline polypropylene with di-2-ethylhexyl peroxydicarbonate, the resulting material is successively subjected to post-treatment of heating it at 100° to 150° C. for 10 minutes to 3 hours in an inert gas atmosphere.

5. A process for producing a polypropylene having a high melt-tensile strength, which process comprises mixing 1 to 10 mmols of di-2-ethylhexyl peroxydicarbonate with 100 g of a linear, crystalline polypropylene having a value (Q) of weight average molecular weight (Mw)/number average molecular weight (Mn) of 7 to 30, in an inert gas atmosphere, reacting the mixture at 70° to 150° C. for 10 minutes to 3 hours and melt-kneading the resulting product, the resulting polypropylene being a linear, crystalline polypropylene having a branching coefficient of substantially 1, and satisfying (A) a relationship between a melt-tensile strength (MS) at 230° C. and an intrinsic viscosity $[\eta]$ measured in tetralin at 135° C., expressed by the expression $\log(MS) > 4.24 \times \log[\eta] - 0.685$, and (B) a relationship between a recrystallization temperature (Tc) measured by means of a differential scanning calorimeter (DSC) and a melting point (Tm), expressed by the expression $(Tc) > 0.784 \times (Tm) - 4.00$, and having (C) a percentage of boiling xylene-extraction residue of 1% by weight or less, and also (D) a value (Q) of weight average molecular weight (Mw)/number average molecular weight (Mn) of 7 to 30.

6. A process according to claim 5, wherein said crystalline polypropylene is a propylene homopolymer.

7. A process according to claim 5, wherein said polypropylene is a propylene-olefin random copolymer containing 10% by weight or less of polymerization units of an olefin other than propylene.

8. A process according to claim 5, wherein, after the reaction of the crystalline polypropylene with di-2-ethylhexyl peroxydicarbonate, the resulting material is successively subjected to post-treatment of heating it at 100° to 150° C. for 10 minutes to 3 hours in an inert gas atmosphere.

9. In the process of reacting di-2-ethylhexyl peroxydicarbonate with a linear, crystalline polypropylene (PP1) in an inert gas atmosphere, followed by melt-kneading, to thereby produce a polypropylene (PP2) which is a linear, crystalline polypropylene having a branching coefficient of substantially 1, and satisfying (A) a relationship between a melt-tensile strength (MS) at 230° C. and an intrinsic viscosity $[\eta]$ measured in tetralin at 135° C., expressed by the expression $\log(MS) > 4.24 \times \log[\eta] - 0.685$, and (B) a relationship between a recrystallization temperature (Tc) measured by means of a differential scanning calorimeter (DSC) and a melting point (Tm), expressed by the expression $(Tc) > 0.784 \times (Tm) - 4.00$, and having (C) a percentage of boiling xylene-extraction residue of 1% by weight or less, a process for producing a polypropylene, which comprises using a crystalline polypropylene composition (PP4) containing a crystalline polypropylene (PP3) having an intrinsic viscosity $[\eta]$ of 2.5 to 10 dl/g as measured in tetralin at 135° C., in a quantity of 1 to 50% by weight, as said linear, crystalline polypropylene (PP1), the intrinsic viscosity $[\eta]$ as a whole being 1.0 to 4.0 dl/g.

* * * * *